United States Patent

Ritzow

[15] 3,639,808
[45] Feb. 1, 1972

[54] RELAY CONTACT PROTECTING CIRCUITS

[72] Inventor: Gerald R. Ritzow, Racine, Wis.
[73] Assignee: Cutler-Hammer, Inc., Milwaukee, Wis.
[22] Filed: June 18, 1970
[21] Appl. No.: 47,226

[52] U.S. Cl. ..........................317/11 E, 307/136, 317/33 SC
[51] Int. Cl. ..........................................................H02h 7/22
[58] Field of Search ..........................317/11 A, 11 E, 33 SC; 307/136

[56] References Cited

UNITED STATES PATENTS 3,237,030  2/1966  Coburn ..........................317/11 A X
3,321,668  5/1967  Baker ..................................317/11 E

OTHER PUBLICATIONS

J. W. von Brimer, " Commutated Relay Combines Solid–State Switching," April, 1965; 13th Relay Conference.

*Primary Examiner*—James D. Trammell
*Attorney*—Hugh R. Rather

[57] ABSTRACT

A contact protecting circuit for a relay having its operating coil energized from a DC supply and its contact controlling an AC load circuit. A triac connected in parallel with the contact conducts before the contact closes and after the contact opens to protect the contact from electrical arcing. In a first version, the triac is controlled by a secondary winding magnetically coupled to the relay coil. In a second version, the triac is controlled by a transformer connected in parallel with the relay coil. In this manner, the triac is gated only for a short time interval when triac conduction is needed and the triac will not continue to conduct in the event the relay contact fails to close.

7 Claims, 3 Drawing Figures

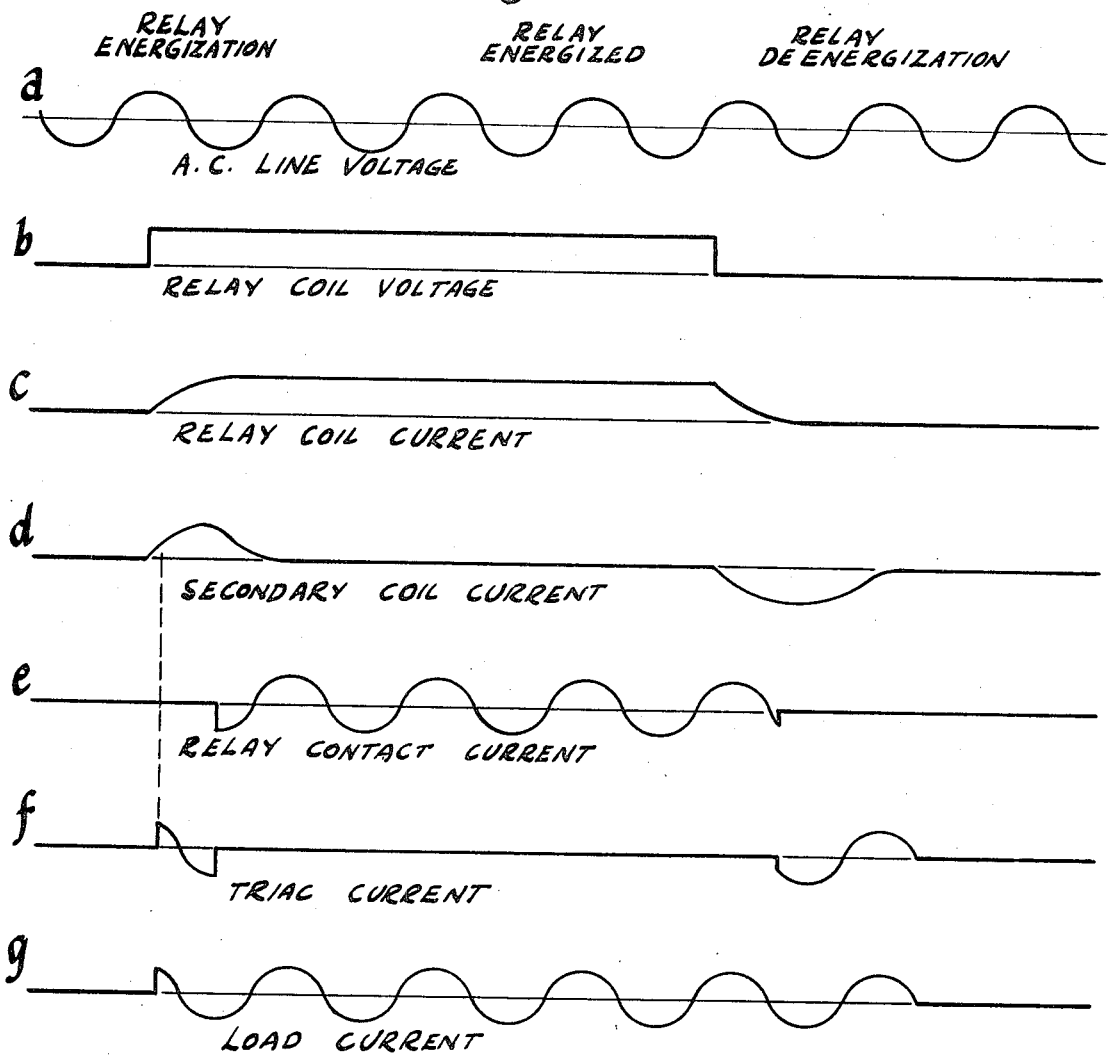

//3,639,808//

RELAY CONTACT PROTECTING CIRCUITS

BACKGROUND OF THE INVENTION

Relay contact protecting circuits of the solid state type have been known heretofore.

One known type uses an SCR is parallel with a relay contact that closes a DC load circuit wherein the relay coil is energized from the common DC supply.

Another known type uses a pair of SCR's in reverse parallel relation (or a single SCR within a full-wave rectifier bridge) connected in parallel with a switch or contact that closes an AC load circuit.

Another type uses a triac in parallel with a switch or relay contact that closes an AC load circuit wherein the relay coil is energized from the common AC supply.

Further types using ignitrons, diodes or transistors for contact arc suppression have also been known.

While these prior contact protecting circuits have been useful for their intended purposes, this invention relates to improvements thereon.

SUMMARY OF THE INVENTION

This invention relates to a relay contact protecting circuit that prevents arcing when the contact is closed or opened.

An object of the invention is to provide an improved contact protecting circuit.

A more specific object of the invention is to provide an improved arc suppression circuit for a relay having a DC energized operating coil and an AC load controlling contact.

Another specific object of the invention is to provide an improved firing circuit for the arc suppression thyristor of an AC load controlling contact whereby the thyristor is rendered conducting before the contact is closed and upon reopening of the contact for a time interval.

Another specific object of the invention is to provide an improved firing control circuit for the arc suppressing thyristor of an AC load controlling contact of a DC energized relay whereby the thyristor is rendered conducting before contact closure for a controlled time interval and does not continue conducting in the event the contact fails to close.

A further specific object of the invention is to provide an improved arc suppression circuit for the AC load controlling contact of a relay that is economical in construction and uses a small amount of electrical energy for its operation.

Other objects and advantages of the invention will hereinafter appear.

BRIEF DESCRIPTION OF THE DRAWINGS

FIG. 3 graphically depicts operating characteristics of the invention.

DESCRIPTION OF THE PREFERRED EMBODIMENTS

Figure 1:
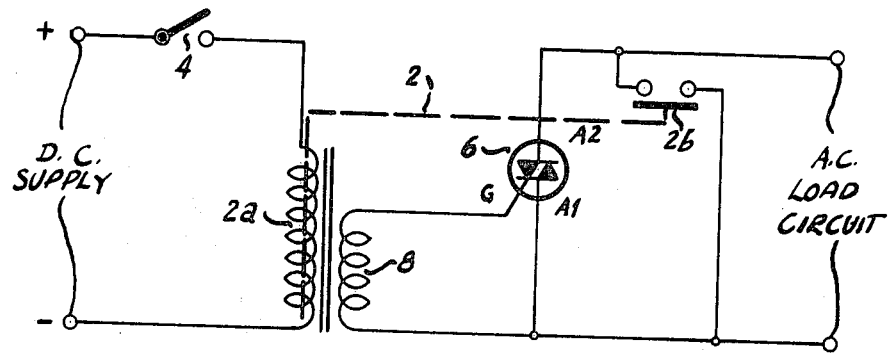
FIG. 1 is a circuit diagram showing a first version of a relay contact protecting circuit constructed in accordance with the invention.

Referring to FIG. 1, there is shown a relay contact protecting circuit according to the invention. As shown therein, a relay 2 is provided with an operating coil 2a and a normally open contact 2b. Operating coil 2a is connected through an on-off switch 4 across a direct current supply to be energized with direct current when the switch is closed. Contact 2b is connected across a pair of alternating current load circuit terminals. These AC load circuit terminals are adapted to be connected to an AC source and a load to be energized. As indicated by the broken line, contact 2b closes when coil 2a is energized and reopens when the energizing circuit of the coil is opened.

The protecting means that suppresses arcs on the contact when it closes and reopens comprises a controllable solid state element such as a bidirectional triode thyristor or triac 6 having its main conduction anode A2–A1 circuit connected in parallel with contact 2b. To control firing of this triac, the relay is provided with a special coil having a second winding 8 magnetically coupled to the relay operating coil and connected across gate G and anode A1 of the triac. This winding may be small since it is required to conduct only the small gating current of the triac. This second winding functions like the secondary winding of a transformer and provides a current pulse to the gate of the triac when the relay operating coil circuit is either closed or opened.

When on-off switch 4 is closed to apply DC power to the relay coil, the relay coil voltage quickly increases from zero to full value as shown by curve b in FIG. 3. The relay coil current starts increasing from zero value as shown by curve c in FIG. 3. In view of the magnetic coupling, this causes a current to be induced into winding 8 during the time that the current is increasing in the relay coil as shown by curve d in FIG. 3. This current in winding 8 is applied to the gate of the triac.

When this current in the gate circuit of the triac reaches a predetermined value, indicated by the vertical broken line intersecting curve d in FIG. 3, the triac switches "on" and closes the circuit from the AC source to the load as shown by curve f of FIG. 3. The AC source voltage now appears across the load rather than across contact 2b except for the voltage drop across the triac which is about 1½ volts that still remains for the relay contact to switch. As a result, alternating current starts flowing in the load as indicated by curve g in FIG. 3 in phase with the AC line voltage shown by curve a.

After the power has been applied to the relay coil long enough to allow its current to rise and overcome the dynamic lag of the relay, contact 2b closes. As a result, the load current shifts from the triac to the contact as indicated by curves e–f in FIG. 3. The load now remains energized.

As shown by curves c and d in FIG. 3, since DC is used for relay coil energization and transformer coupling is used from the relay coil through secondary winding 8 to fire the triac, such secondary coil current flows only during the time that the relay coil current is changing. This arrangement protects the triac. Thus, in the event the relay contact fails to close, the firing current will cease after a short time as shown by curve d and the triac will stop conducting at the end of the AC line voltage half-cycle when the triac current goes to zero. This protects the triac in that it will not continue to conduct the large load current which might result in its destruction. This enables use of a triac of a smaller electrical rating capable of conducting the load current for a short time since it need not continue to conduct the load current if the contact should fail to close.

For this reason, the triac need not have a "continuous" rating for the load current since it carries the load current only for a short time. For example, a triac having a 10 ampere rating would be quite adequate for a 50 ampere load since its one cycle surge rating would be about 80–100 amperes. Therefore, one can use a well designed 5-ampere relay with large current carrying members in combination with a 5–10 ampere triac to switch 50 ampere loads.

The triac switches on within 5 ms. after the application of voltage to the relay coil. Since a typical relay requires about 10–20 ms. to operate, the triac will conduct for 5–15 ms. before the contact closes.

The voltage drop across the triac is 1–2 volts. The closed contact will have less than 1 volt across it. Since the triac must have 1–2 volts anode voltage for conduction, the closed contact will render the triac nonconducting. If the contact resistance is too high, the triac will nevertheless stop conducting at the end of the half-cycle when the current goes to zero. When the contact closes, the triac is shunted and no longer conducts any current even though it might still be receiving gate current for 510 ms.

Figure 2:
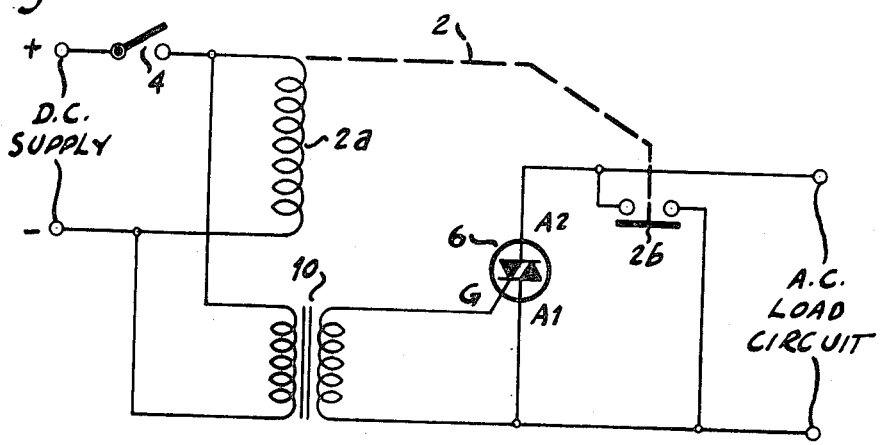
FIG. 2 is a circuit diagram showing a second version of the invention.

FIG. 2 shows a second version of relay contact protecting circuit which, however, functions in a similar manner. Instead of using a two-winding relay as in FIG. 1, this version uses a separate transformer to enable addition of the arc suppression circuit to a conventional relay. For this purpose, a transformer 10 is provided with its primary winding connected in parallel with the relay operating coil and its secondary winding connected to the gate-common anode circuit of the triac. This transformer may be small since it is required to provide only the small gating current for the triac.

When switch 4 is closed to energize the relay coil, the primary winding of the transformer is also energized in parallel therewith. A current is induced in the secondary winding which fires the triac into conduction to energize the load. Thereafter, the relay contact closes to divert the load current therethrough. As a result, the triac stops conducting.

From the foregoing, it will be seen that in both the FIG. 1 and FIG. 2 versions of the circuit the triac suppresses any arcs that would otherwise occur at the contact upon closure thereof.

The right-hand portion of the curves in FIG. 3 shows the function of the circuit when switch 4 is reopened to deenergize the relay. Such opening of the on-off switch causes the relay coil voltage to decrease abruptly as shown by curve b. This starts the relay coil current decreasing as shown by curve c. This abrupt disconnection of DC power causes a current to be induced in winding 8 in FIG. 1 or in the transformer secondary winding in FIG. 2. As shown by curve d, this current is of the opposite polarity as compared to the current when the on-off switch was closed since the induction is caused by a collapsing field rather than an increasing magnetic field. But since the triac can be fired by either polarity of gate current, the triac is gated for the duration of the secondary coil current shown by curve d.

In this case, the contact opening and triac conduction sequence is reversed. As shown by curve e, the relay contact opens after the inherent dynamic delay. The triac cannot conduct before the contact opens because the contact keeps its anode voltage down to zero. However, when the relay contact opens to interrupt the current therein as shown by curve e, the instantaneous load supply voltage is applied across the triac anodes. Since the triac is still being gated by the current induced in the secondary winding as shown by curve d, the current is diverted from the contact to the triac with no arcing at the contact. The load current continues to flow as shown by curve g.

The secondary current that has been gating the triac decreases to zero after a short time as shown by curve d. This causes the triac to stop conducting at the end of the AC supply voltage half-cycle (curve a) when the triac current decreases to zero as shown by curve f thereby to complete deenergization of the load.

While the circuits hereinbefore described are effectively adapted to fulfill the objects stated, it is to be understood that the invention is not intended to be confined to the particular preferred embodiments of relay contact protecting circuits disclosed, inasmuch as they are susceptible of various modifications without departing from the scope of the appended claims.

I claim:

1. In a relay contact protecting system, the combination comprising:
a source of DC supply voltage;
a relay having an operating coil adapted to be energized from said DC source and a contact adapted to control an AC supplied load circuit, said DC relay coil circuit being electrically isolated from said AC load circuit;
and contact protecting means for suppressing arcing at said contact when the relay operating coil is energized and deenergized comprising:
a gating type semiconductor element connected in parallel with said contact;
and electrically isolating firing control means for said semiconductor element supplied from said DC source and operable for a controlled short time interval during the transient electrical period occurring after application of said DC voltage to or removal of said DC voltage from the relay operating coil to apply a firing current pulse signal to said semiconductor element to render the latter conducting for a limited time interval before the relay contact closes and after the relay contact opens to divert the current therefrom so hat said semiconductor element does not continue conducting the load current in the event said contact fails to close.

2. The invention defined in claim 1, wherein said firing control means comprises:
a secondary winding magnetically coupled to said relay operating coil and having a current induced therein in response to change in current in said relay operating coil to apply a firing current to said semiconductor element.

3. The invention defined in claim 1, wherein said firing control means comprises:
a transformer having a primary winding energized from the relay coil circuit and a secondary winding connected to apply a firing signal to said semiconductor element.

4. The invention defined in claim 1, wherein said gating type semiconductor element comprises:
a bidirectional triode thyristor having its anodes circuit connected across said relay contact and having its gate circuit connected to said firing control means.

5. In an electromagnetic relay system having its operating coil circuit adapted to be energized from a direct current source and having its contact adapted to control an alternating current load circuit, the improvement comprising:
relay contact protecting means for suppressing electrical arcing at the contact when the relay is operated to energize or deenergize the load comprising:
a controllable bidirectional thyristor having a main current conduction path connected in parallel with said relay contact and having a control connection;
and variable voltage responsive means supplied from the relay operating coil circuit and operable when the direct current source is connected to or disconnected from the relay operating coil circuit for applying a firing current pulse to said thyristor control connection for a short time interval sufficient to prevent arcing at the relay contact so that said thyristor does not continue conducting the load current in the event said contact fails to close.

6. The invention defined in claim 5, wherein said variable voltage responsive means comprises:
electrical isolating means for developing said firing signal in response to transient voltage change in the relay coil circuit while keeping the AC and DC circuits isolated from one another electrically.

7. The invention defined in claim 6, wherein said electrical isolating means comprises:
a transformer secondary winding having a current induced therein in response to said transient voltage change to provide a firing current to said thyristor control connection.

* * * * *